Nov. 18, 1924.
W. W. GARRIOTT
1,516,230
VEHICLE WHEEL
Filed April 30, 1923    2 Sheets-Sheet 1
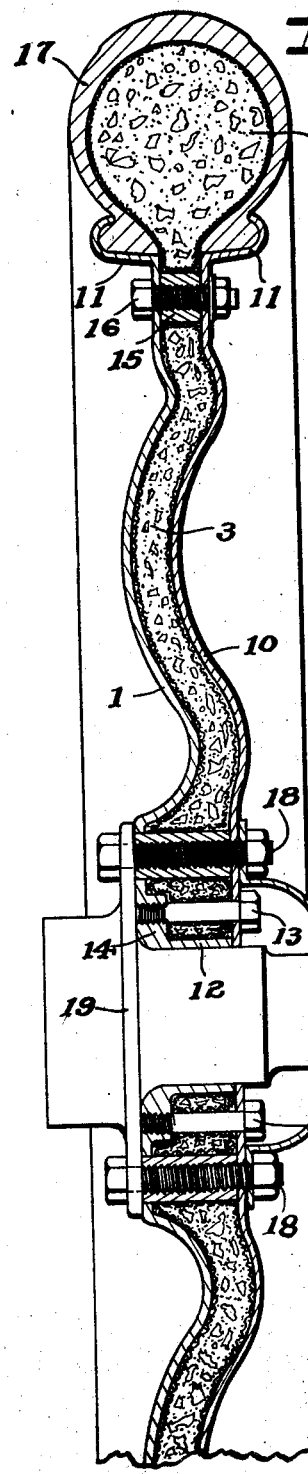
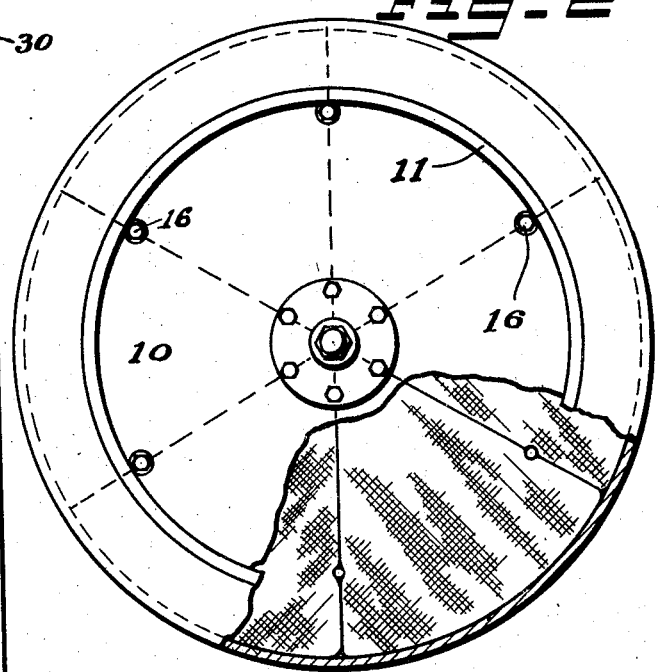
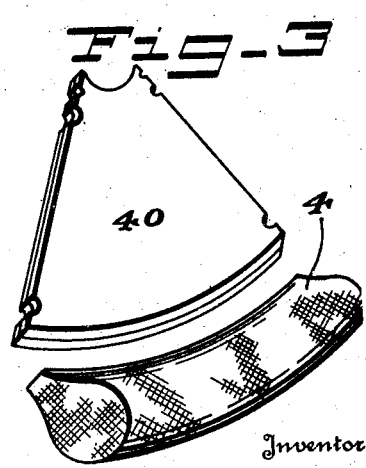
Inventor
William W. Garriott
By H.L.&C.L. Reynolds
Attorney Nov. 18, 1924.
W. W. GARRIOTT
VEHICLE WHEEL
Filed April 30, 1923
1,516,230
2 Sheets-Sheet 2
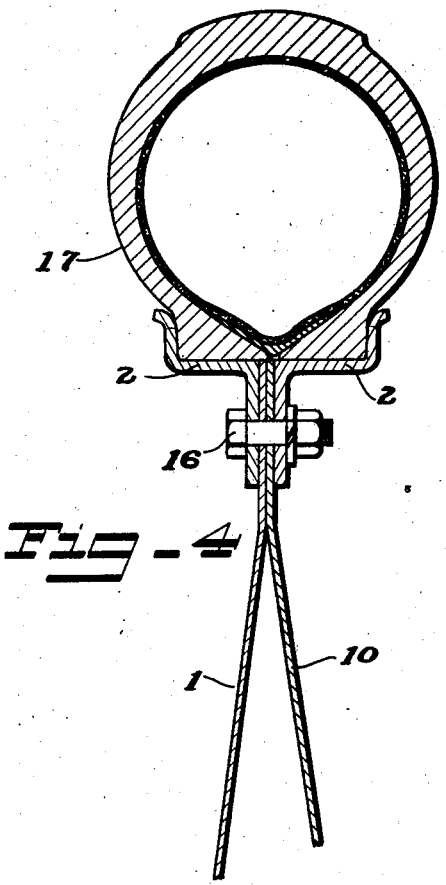
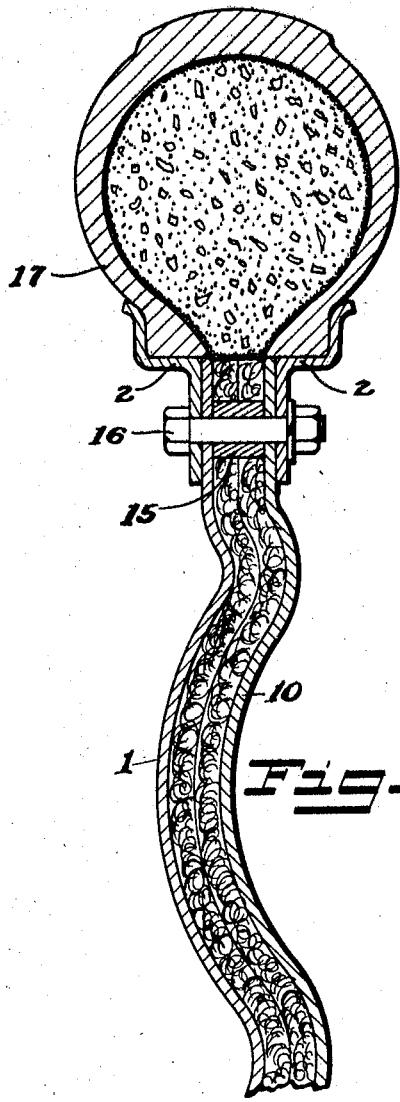
Inventor
William W. Garriott
By H. L. Reynolds
Attorney Patented Nov. 18, 1924.

1,516,230

UNITED STATES PATENT OFFICE.

WILLIAM W. GARRIOTT, OF SEATTLE, WASHINGTON.

VEHICLE WHEEL.

Application filed April 30, 1923. Serial No. 635,602.

*To all whom it may concern:*

Be it known that I, WILLIAM W. GARRIOTT, a citizen of the United States of America, and resident of the city of Seattle, in the county of King and State of Washington, have invented certain new and useful Improvements in Vehicle Wheels, of which the following is a specification.

My invention relates to vehicles wheels and particularly to vehicle wheels of the type which carry either a pneumatic or cushion tire.

One object of my invention is to provide a wheel having a rim so constructed that the tire retaining flanges at the opposite sides of the rim are each part of a member which is independent of the other, and are secured in place so that one at least of these rings may be bodily removed to thereby free the tire for removal or to permit application of the tire to the rim.

Another object of my invention is to provide a wheel in which the central part is composed of two separated disks forming between them a chamber in which is placed deadening material, either in the form of a plastic compound or sheets of elastic material, and in which the tire casing employed may be filled with a substance consisting of a plastic binder and a resilient aggregate, whereby such a tire will become, in effect, a cushion tire.

Other objects of my invention will appear from a study of the description and the drawings accompanying herewith.

The features of my invention which I believe to be novel and upon which I wish to secure a patent, will be hereinafter particularly defined in the claims.

The accompanying drawings show my invention embodied in typical constructions such as I now prefer to use.

Figure 1 is a cross section through a wheel of the type employing a plastic filler having a resilient aggregate.

Figure 2 is a face view of such a wheel with a portion of one of the disk plates, the rim, and the tire casing broken away.

Figure 3 shows in perspective, filler elements which may be employed in connection with a wheel of the type shown in Figures 1 and 2.

Figure 4 is a cross section of a tire, a rim, and a portion of the disks of a modified construction.

Figure 5 is a similar cross section showing a construction differing but little from that of Figure 1.

Certain features of my invention are particularly adapted for use in connection with disk wheels, while other features may be employed in connection with other types of wheels. In Figures 1 and 2 a disk type of construction for the wheel has been shown. The hub shown in Figure 1 is a typical hub of a standard make of car. This has been illustrated to show the application of my invention thereto but it is evident that the construction of wheel illustrated may be applied to other makes of cars.

The wheel center is composed of two disks, 1 and 10, these being substantially alike except that they are made reversed so far as necessary to fit on opposite sides of a wheel. One of these plates, the same being the plate 1, as illustrated, in its central portion or about the aperture which receives the hub is provided with a tubular flange 12 which extends into contact with the opposite plate 10. The two plates are secured together at the hub by bolts as 13 so that the plates may be separated if desired.

At the outer or peripheral edges of the plates 1 and 10 they are flanged outwardly or away from the central plane of the wheel so as to form two curved flanges 11 adapted to form the wheel rim and to receive and hold the tire casing 17. The tire illustrated in Figure 1 is of the clincher type of construction. Consequently the flange 11 is made of a contour adapted to fit and hold such a tire. However, the flanged portions 11 may be made of whatever shape is necessary to fit the type of tire to be employed. A modified shape for this is shown in Figures 4 and 5.

Distributed about the peripheral portion of the disks 1 and 10 are bolts 16 which secure the two plates together. Spacing ferrules as 15 may be employed to hold the plates apart if this be desired, or they may be clamped in actual contact with each other, as is shown in Figure 4. Bolts 18 may be employed for securing the disk centers to the hub flange 19.

In the type of construction shown in Figures 1, 2 and 3, a layer 3 of deadening material is placed between the two plates. This deadening material is shown as extending from the hub to the periphery of the wheel center. In the type of construction shown in Figures 1 and 2, the space which contains the material 3 is supposed to communicate freely with the interior of the tire casing 17 all of the way about the periphery of the wheel. The tire casing is also provided with similar material as a filler. This filling material as applied between the two plates of the disk, may vary widely in its character and material. It may be a sheet or sheets of felted fabric rubber, or any suitable material, such as the plates 40 shown in Figure 3. The filling material 30 which is employed in the tire casing, and optionally the material 3 found in the center of the wheel, may be composed of a plastic binder and an elastic or resilient aggregate which may be compressed to a certain extent, thereby giving such a tire a cushioning effect similar to that of an efficient cushion tire and approaching closely to that of a pneumatic tire.

The filling material which I prefer to use for this purpose is one which employs granular cork as the aggregate. The binder used in connection with this may vary widely. I have found various materials to act satisfactorily for this purpose. Such binder should preferably be something which would retain its fluid character, not hardening in use and through the lapse of time, and one which will permit fairly free flow action of the mass.

As stated the filling material employed between the disk plates 1 and 10 may be separate from that employed in the tire casing. For instance, felted fibers may be employed, these being cut into sheets as indicated in Figure 3, of triangular segmental shape so as to fit between the bolts 16 which secure the disks together. The filler for the tire casing should, however, preferably be placed within bags as 4, which are of a suitable length. These bags may be of a length to correspond with the length of one of the sectors into which the wheel is divided by the securing bolts 16. They may, however, be shorter or longer as desired. The use of bags as a preliminary retainer for this material permits it to be handled and put into place in a practical way. The bags may also be left in the tire casing as they will not interfere materially with the free flowing action of the filler. The filler for the space between the plates 1 and 10, unless self-sustaining, may also be supplied in bags, either separate from those containing the tire filler 30, or integral therewith, as has been indicated in Figures 1 and 2.

For the purpose of removing a tire when mounted upon such a wheel, one of the plates as the plate 10, which is in the outer face of the wheel, is bodily removed if the construction shown in Figure 1 is employed. This permits the tire casing to fit snugly upon the rim 11 and yet be held securely by the outstanding portions 11 of this flange.

In Figures 4 and 5 a construction is shown which differs slightly from this. The plates 1 and 10 which form the wheel center, extend to the tire casing and stop at that point. The tire retaining flange which forms the rim and holds the tire in place is shown as made of a separate ring-like member 2. One of these may be permanently and integrally secured to its corresponding disk center. This may be done by electric welding, brazing, or any suitable means. One at least of these ring members 2 should, however, be freely removable by the removal of the bolts 16, and both may be so removable. This permits free and easy removal of the tire casing. The two constructions illustrated in Figures 4 and 5 are essentially the same except that in the one case the disks 1 and 10 have their outer peripheral sections secured in immediate contact, while in the other case they are secured by the use of separating ferrules, as 15, the same being the construction shown in Figure 1. The construction shown in Figure 5 is one in which the rim members 2, corresponding with the flanges 11 of Figure 1, are, one or both, separable from the disks for convenient removal of the tire. This type of rim and wheel center may be adapted for use with any standard tire, whether pneumatic or cushion.

I have found that by placing a layer of deadening material between the plates of a double disk wheel, the metallic ringing sound which is often heard from such wheels when in use, is very much reduced or entirely eliminated.

By the construction of the wheel rim illustrated and described, it is possible to very quickly and easily remove a tire and put another in its place. However, it is not a tire rim which is removed in my invention but one of the members which carries one tire-retaining flange, whereupon the tire may be removed. This may be as conveniently done as the removal and placing of one of the standard removable tire rims with its tire.

What I claim as my invention is:

1. A wheel having a center composed of two separated metal disks and a filling material between said disks containing a resilient aggregate and a plastic binder.

2. A wheel having a center composed of two separated metal plates and a filler composed of cork particles and a plastic binder.

3. A wheel having a center composed of two separated plates having their outer edges shaped to form a tire holding rim, a tire casing mounted on said rim and a filler for said tire extending between the plates forming the center and composed of an aggregate of resilient particles and a plastic binder.

4. A wheel having a center composed of spaced metal plates and a filler composed of a resilient aggregate and a plastic binder contained in fabric envelopes.

5. A wheel having a center composed of separated plates forming a chamber opening freely at the periphery, and a tire casing of flexible material secured to said center and having free interior communication with said chamber in the center and a filler for tire and center having a resilient aggregate and a plastic binder.

6. A wheel having a center composed of two disks, bolts and spacers securing said disks adjacent the hub and periphery to hold them in spaced relation, the peripheral edges of said disks being flanged outwardly and over to conjointly form a clincher rim, a clincher tire casing secured on said rim and having its interior freely communicating with the space between the disks, and a resilient plastic mass filling the tire casing and the space between the disks.

Signed at Seattle, King County, Washington, this 12th day of April, 1923.

WILLIAM W. GARRIOTT.